(12) United States Patent
Engi et al.

(10) Patent No.: US 12,745,183 B2
(45) Date of Patent: Sep. 22, 2026

(54) DYNAMIC FEATURE SHEDDING IN SENSOR ENABLED NETWORKS

(71) Applicant: Cisco Technology, Inc., San Jose, CA (US)

(72) Inventors: Derek W. Engi, Pleasant Ridge, MI (US); Gonzalo A. Salgueiro, Raleigh, NC (US); Marisol Palmero Amador, Toledo (ES); Md Atiqur Rahman, Sunnyvale, CA (US); Pascal Thubert, Roquefort les Pins (FR)

(73) Assignee: Cisco Technology, Inc., San Jose, CA (US)

( * ) Notice: Subject to any disclaimer, the term of this patent is extended or adjusted under 35 U.S.C. 154(b) by 504 days.

(21) Appl. No.: 18/344,107

(22) Filed: Jun. 29, 2023

(65) Prior Publication Data

US 2024/0155500 A1 May 9, 2024

Related U.S. Application Data

(60) Provisional application No. 63/382,652, filed on Nov. 7, 2022, provisional application No. 63/382,643, filed on Nov. 7, 2022.

(51) Int. Cl.
*H04W 52/02* (2009.01)

(52) U.S. Cl.
CPC ... *H04W 52/0264* (2013.01); *H04W 52/0251* (2013.01)

(58) Field of Classification Search
CPC ......... H04W 52/0264; H04W 52/0251; G06N 3/09; G06N 3/0985; G06N 5/01;
(Continued)

(56) References Cited

U.S. PATENT DOCUMENTS

2008/0178019 A1* 7/2008 McGrane .................. G06F 1/26 713/320
2012/0330586 A1 12/2012 Gatts et al.
(Continued)

OTHER PUBLICATIONS

Fithritama, Alifia, et al. "Modeling fuzzy rules for managing power consumption of ethernet switch." 2015 23rd International Conference on Software, Telecommunications and Computer Networks (SoftCOM). IEEE, 2015. (Year: 2015).*

*Primary Examiner* — Fayyaz Alam
(74) *Attorney, Agent, or Firm* — Rutan & Tucker, LLP; Ravi Mohan; Marc A. McClain

(57) ABSTRACT

Described herein are devices, systems, methods, and processes for managing power consumption in network nodes by dynamically disabling and reenabling features based on real-time power consumption monitoring and historical data analysis. A machine learning model is trained using historical sensor data and historical feature data to predict power consumption and derive feature-to-power association data. The power budget is determined based on sustainability goals. Real-time power consumption is monitored, and features are disabled or reenabled based on their priorities and power consumption levels to maintain the power budget. The machine learning model is validated and updated using new historical data to improve its prediction accuracy and adaptability. The feature-to-power association data is distributed to network nodes and management systems for power management purposes. These devices, systems, methods, and processes enable efficient power management in network nodes while maintaining optimal network performance and contributing to sustainability goals.

11 Claims, 12 Drawing Sheets

(58) Field of Classification Search
CPC .......... G06N 7/01; G06N 20/10; G06N 20/20; H04L 41/0816; H04L 41/147
See application file for complete search history.

(56) References Cited

U.S. PATENT DOCUMENTS

| | | | | |
|---|---|---|---|---|
| 2013/0124885 | A1* | 5/2013 | Davis | G06F 1/325<br>713/320 |
| 2016/0349829 | A1* | 12/2016 | Spiel | G06F 1/3212 |
| 2017/0329383 | A1 | 11/2017 | Bailey et al. | |
| 2025/0384650 | A1* | 12/2025 | Kuo | G06V 10/25 |

* cited by examiner

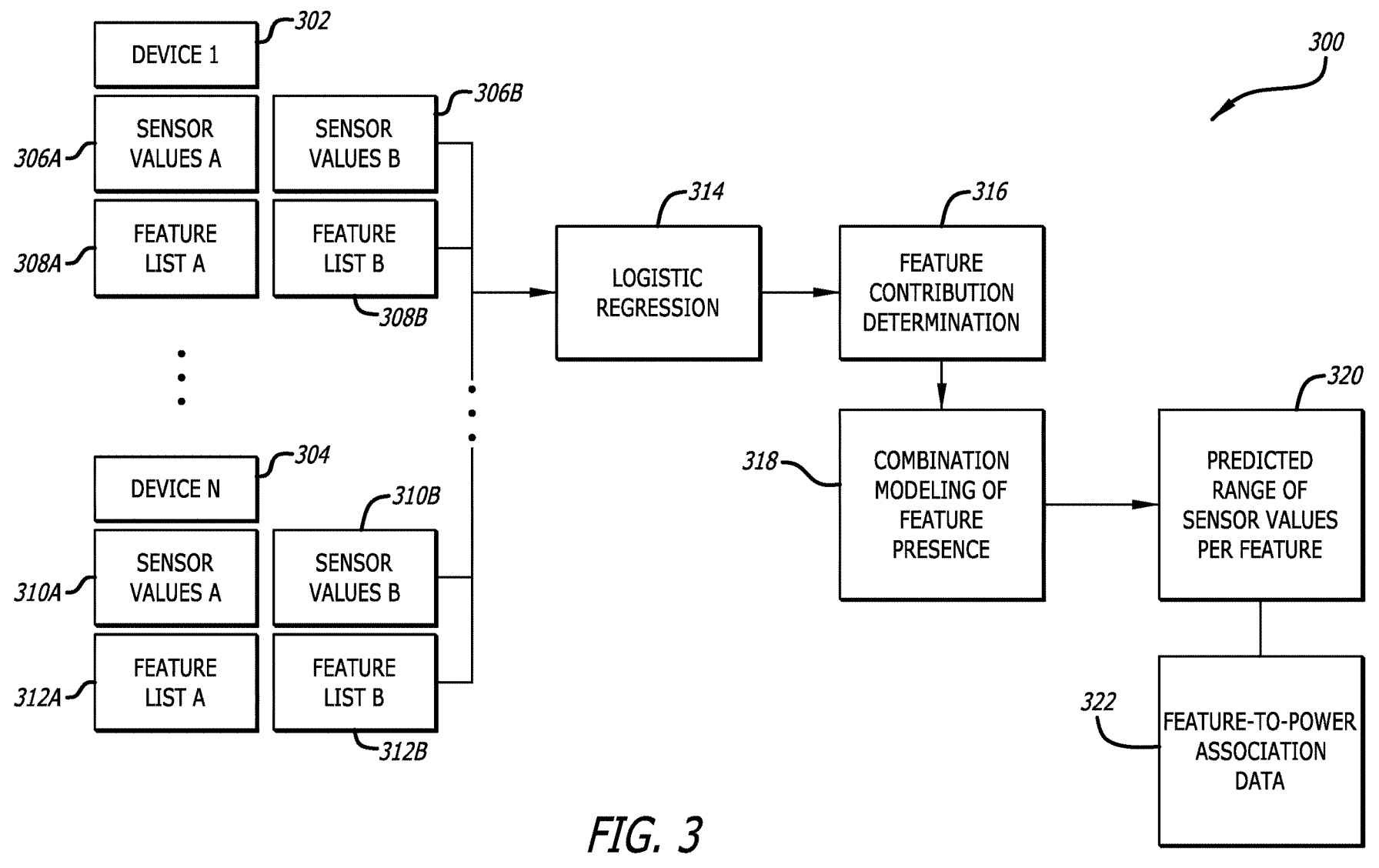

300

DEVICE 1 — 302

SENSOR VALUES A — 306A

FEATURE LIST A — 308A

SENSOR VALUES B — 306B

FEATURE LIST B — 308B

DEVICE N — 304

SENSOR VALUES A — 310A

FEATURE LIST A — 312A

SENSOR VALUES B — 310B

FEATURE LIST B — 312B

LOGISTIC REGRESSION — 314

FEATURE CONTRIBUTION DETERMINATION — 316

COMBINATION MODELING OF FEATURE PRESENCE — 318

PREDICTED RANGE OF SENSOR VALUES PER FEATURE — 320

FEATURE-TO-POWER ASSOCIATION DATA — 322

FIG. 3

400
402
POWER BUDGET THRESHOLD
404
PREDICTED SENSOR /POWER USAGE EVALUATION
406
FEATURE PRIORITY EVALUATION
408
FEATURE REBALANCING
410
FEATURE-TO-POWER ASSOCIATION DATA
TIME ITERATION

700

ACCESS FEATURE-TO-POWER ASSOCIATION DATA
710
IDENTIFY FEATURES OF THE NETWORK NODE
720
DETERMINE A POWER BUDGET
730
DISABLE AT LEAST ONE FEATURE
740

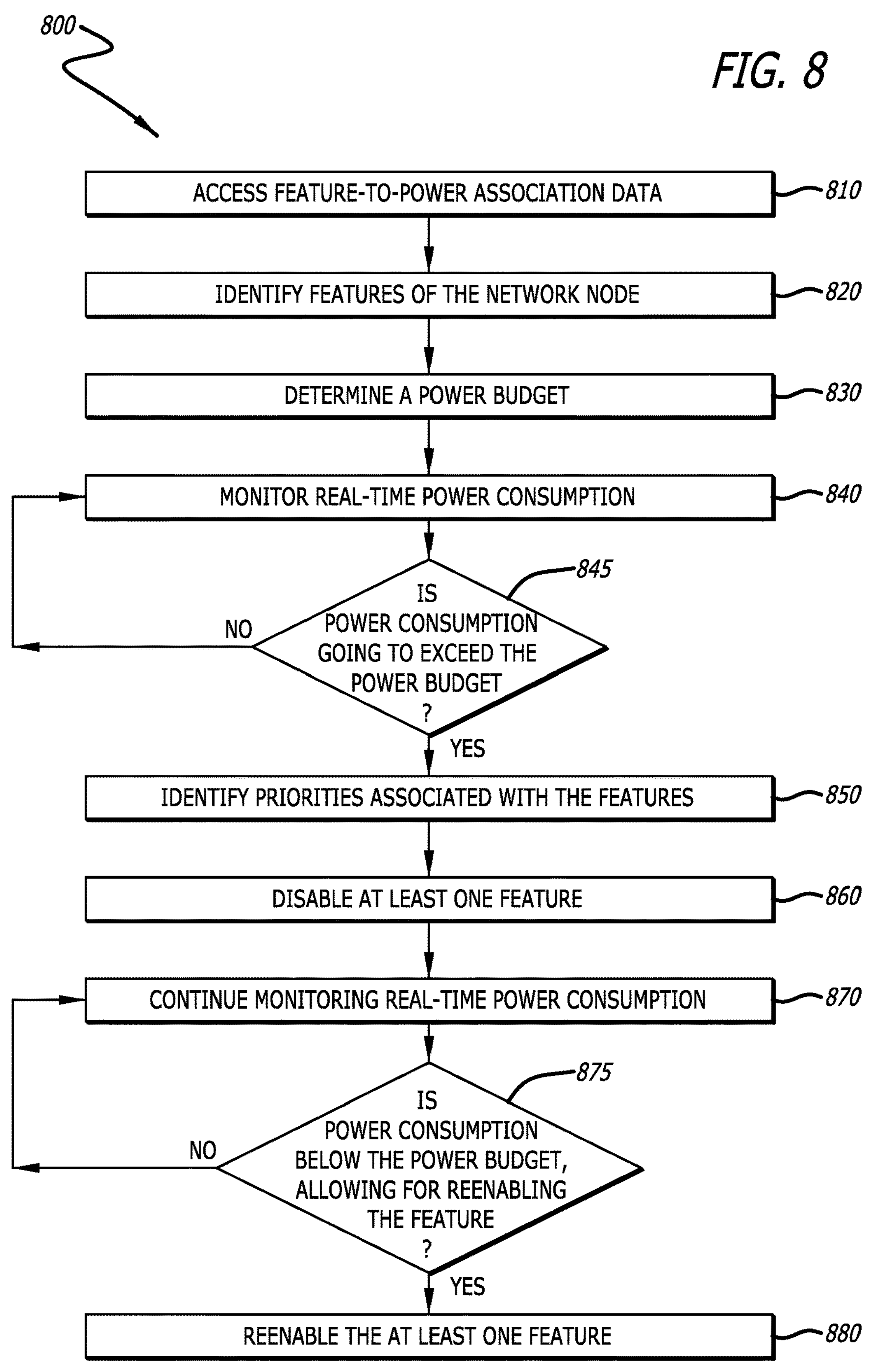
800
FIG. 8
ACCESS FEATURE-TO-POWER ASSOCIATION DATA
810
IDENTIFY FEATURES OF THE NETWORK NODE
820
DETERMINE A POWER BUDGET
830
MONITOR REAL-TIME POWER CONSUMPTION
840
IS POWER CONSUMPTION GOING TO EXCEED THE POWER BUDGET ?
845
NO
YES
IDENTIFY PRIORITIES ASSOCIATED WITH THE FEATURES
850
DISABLE AT LEAST ONE FEATURE
860
CONTINUE MONITORING REAL-TIME POWER CONSUMPTION
870
IS POWER CONSUMPTION BELOW THE POWER BUDGET, ALLOWING FOR REENABLING THE FEATURE ?
875
NO
YES
REENABLE THE AT LEAST ONE FEATURE
880

900

ACCESS HISTORICAL DATA
910
ASSOCIATE HISTORICAL SENSOR DATA WITH HISTORICAL FEATURE DATA
920
TRAIN THE MACHINE LEARNING MODEL
930
STORE THE MACHINE LEARNING MODEL
940

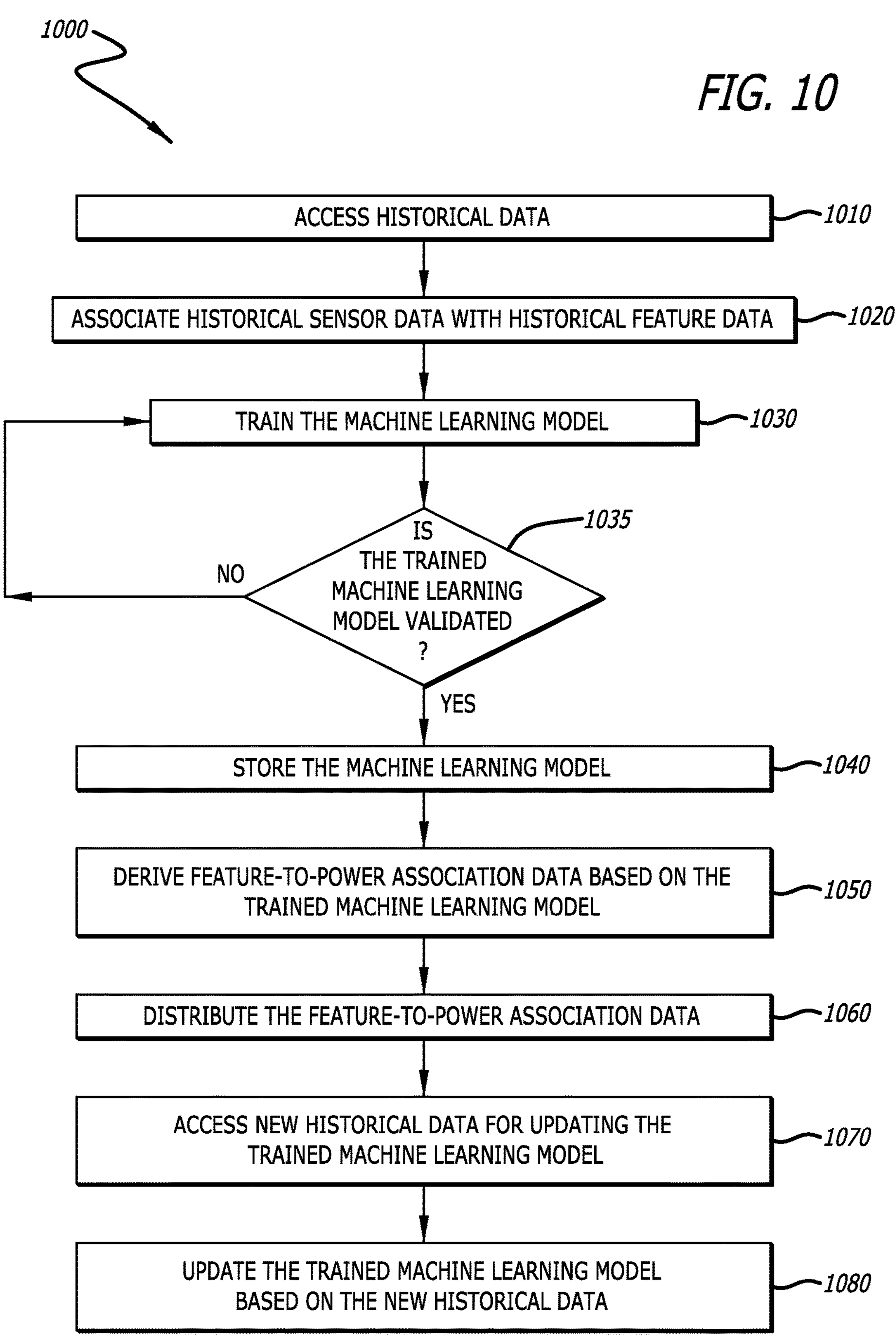
1000
FIG. 10
ACCESS HISTORICAL DATA
1010
ASSOCIATE HISTORICAL SENSOR DATA WITH HISTORICAL FEATURE DATA
1020
TRAIN THE MACHINE LEARNING MODEL
1030
IS THE TRAINED MACHINE LEARNING MODEL VALIDATED ?
1035
NO
YES
STORE THE MACHINE LEARNING MODEL
1040
DERIVE FEATURE-TO-POWER ASSOCIATION DATA BASED ON THE TRAINED MACHINE LEARNING MODEL
1050
DISTRIBUTE THE FEATURE-TO-POWER ASSOCIATION DATA
1060
ACCESS NEW HISTORICAL DATA FOR UPDATING THE TRAINED MACHINE LEARNING MODEL
1070
UPDATE THE TRAINED MACHINE LEARNING MODEL BASED ON THE NEW HISTORICAL DATA
1080

1140
LOCAL AREA NETWORK
1100
DEVICE(S)
1112
NETWORK INTERFACE CONTROLLER
1116
INPUT/OUTPUT CONTROLLER
1106
CHIPSET
PROCESSOR(S)
RAM
ROM
STORAGE CONTROLLER
1104
1108
1110
1114
1118
STORAGE
1120
OPERATING SYSTEM
APPLICATIONS
1122
1124
POWER CONSUMPTION MANAGEMENT LOGIC
MACHINE-LEARNING MODEL
1126
1128
1130
1132
FEATURE-TO-POWER ASSOCIATION DATA
FEATURE PRIORITY DATA
POWER BUDGET DATA
1102
ENVIRONMENT

1240
LOCAL AREA NETWORK
1200
DEVICE(S)
1212
NETWORK INTERFACE CONTROLLER
1216
INPUT/OUTPUT CONTROLLER
1206
CHIPSET
PROCESSOR(S)
RAM
ROM
STORAGE CONTROLLER
1204
1208
1210
1214
1218
STORAGE
1220
OPERATING SYSTEM
APPLICATIONS
1222
1224
MACHINE LEARNING LOGIC
MACHINE-LEARNING MODEL
1226
1228
1230
1232
HISTORICAL SENSOR DATA
HISTORICAL FEATURE DATA
FEATURE-TO-POWER ASSOCIATION DATA
1202
ENVIRONMENT

DYNAMIC FEATURE SHEDDING IN SENSOR ENABLED NETWORKS

The present disclosure relates to network management. More particularly, the present disclosure relates to dynamically enabling and disabling features at network devices based on predicted power consumption and feature prioritization.

PRIORITY

This application claims the benefit of and priority to U.S. Provisional Application No. 63/382,643, filed Nov. 7, 2022, and U.S. Provisional Application No. 63/382,652, filed Nov. 7, 2022, which are incorporated in their entireties herein.

BACKGROUND

The increasing demand for high-performance network devices has led to a significant rise in power consumption. As a result, there is a growing need for effective power management solutions to ensure the efficient operation of these devices while minimizing their environmental impact. Network devices, such as routers, switches, and line cards, often have numerous features and capabilities that can be enabled or disabled based on the requirements of the network operator. However, managing the power consumption of network devices in a dynamic environment with varying traffic loads and changing requirements presents a challenge for network operators.

Current power management solutions often focus on monitoring and controlling the overall power consumption of network devices at the hardware level. These solutions may involve adjusting the power supply voltage, controlling the clock frequency, or implementing power gating techniques to reduce power consumption. While these approaches can be effective in managing power consumption, they primarily address the power consumption of the entire device rather than considering the specific needs and priorities of different network scenarios. This limitation makes it difficult for network operators to optimize power consumption based on the dynamic requirements of their networks.

Furthermore, existing power management solutions do not typically consider the dynamic nature of network device operation and the changing requirements of the network. Network devices may experience fluctuations in power consumption due to variations in traffic load, changes in the operating environment, or the activation of new features. These fluctuations can make it challenging for network operators to maintain compliance with power consumption targets and sustainability regulations. Consequently, there is a need for a more comprehensive and dynamic power management solution that can adapt to the changing requirements of network devices and provide a detailed understanding of the power consumption impact of individual features and capabilities.

SUMMARY OF THE DISCLOSURE

Systems and methods for dynamically enabling and disabling features at network devices based on predicted power consumption and feature prioritization in accordance with embodiments of the disclosure are described herein. In some embodiments, a network node includes a processor, at least one network interface controller configured to provide access to a network, and a memory communicatively coupled to the processor. The memory includes a power consumption management logic that is configured to access feature-to-power association data derived from a machine learning process, identify a plurality of features of the network node associated with a priority, determine a power budget, and disable at least one feature of the plurality of features based on the power budget, the priority associated with the at least one feature, and the feature-to-power association data.

In some embodiments, the power consumption management logic is configured to determine a real-time power consumption level of the network node based on reading at least one sensor of the network node, and wherein the at least one feature is enabled or disabled based further on the determined real-time power consumption level.

In some embodiments, the feature-to-power association data is indicative of an index of an impact that each of the plurality of features has on power consumption at the network node.

In some embodiments, the at least one feature is disabled in response to an increased power consumption by a second feature of the plurality of features, the second feature being associated with a greater priority than the at least one feature.

In some embodiments, the power consumption management logic is further configured to throttle a flow at a network ingress point based on the power budget and the feature-to-power association data.

In some embodiments, the power consumption management logic is further configured to sample a subset of packets of a flow based on the power budget and the feature-to-power association data.

In some embodiments, the power consumption management logic is further configured to reenable the at least one feature in response to a real-time power consumption level of the network node falling below the power budget.

In some embodiments, the network node includes at least one of a router, a switch, or a line card.

In some embodiments, the machine learning process is associated with a logistic regression model.

In some embodiments, the logistic regression model is trained online.

In some embodiments, the logistic regression model is trained offline.

In some embodiments, a device, includes a processor, at least one network interface controller configured to provide access to a network, and a memory communicatively coupled to the processor. The memory includes a machine learning logic that is configured to access historical data associated with one or more network devices including historical sensor data and historical feature data, associate the historical sensor data with the historical feature data, and train a machine learning model based on the associated historical sensor data and the historical feature data. The machine learning model is further configured to be usable for predicting at least one sensor value range associated with enabling or disabling at least one feature and store the trained machine learning model in the memory.

In some embodiments, the trained machine learning model includes a logistic regression model.

In some embodiments, the historical sensor data and the historical feature data are associated with a plurality of collections at regular intervals from the one or more network devices.

In some embodiments, the machine learning logic is further configured to derive feature-to-power association data based on the trained machine learning model.

In some embodiments, the feature-to-power association data is indicative of an index of an impact that each of a plurality of features has on power consumption at a network node.

In some embodiments, the machine learning logic is further configured to transmit the feature-to-power association data to a network node.

In some embodiments, the device resides in a cloud.

In some embodiments, a method for network node feature shedding includes accessing feature-to-power association data derived from a machine learning process, identifying a plurality of features of a network node associated with a priority, determining a power budget, and disabling at least one feature of the plurality of features based on the power budget, the priority associated with the at least one feature, and the feature-to-power association data.

In some embodiments, the feature-to-power association data is indicative of an index of an impact that each of the plurality of features has on power consumption at the network node.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

FIG. 3 is a diagram illustrating the components and interactions for collecting historical data from multiple devices and generating a feature-to-power model using logistic regression in accordance with various embodiments of the disclosure;

FIG. 8 is a flowchart depicting a process for managing power consumption by dynamically disabling and reenabling features of a network node based on real-time power consumption monitoring in accordance with various embodiments of the disclosure;

FIG. 10 is a flowchart depicting a process for training, validating, and updating a machine learning model to manage power consumption by analyzing historical data in accordance with various embodiments of the disclosure;

Figure 1:
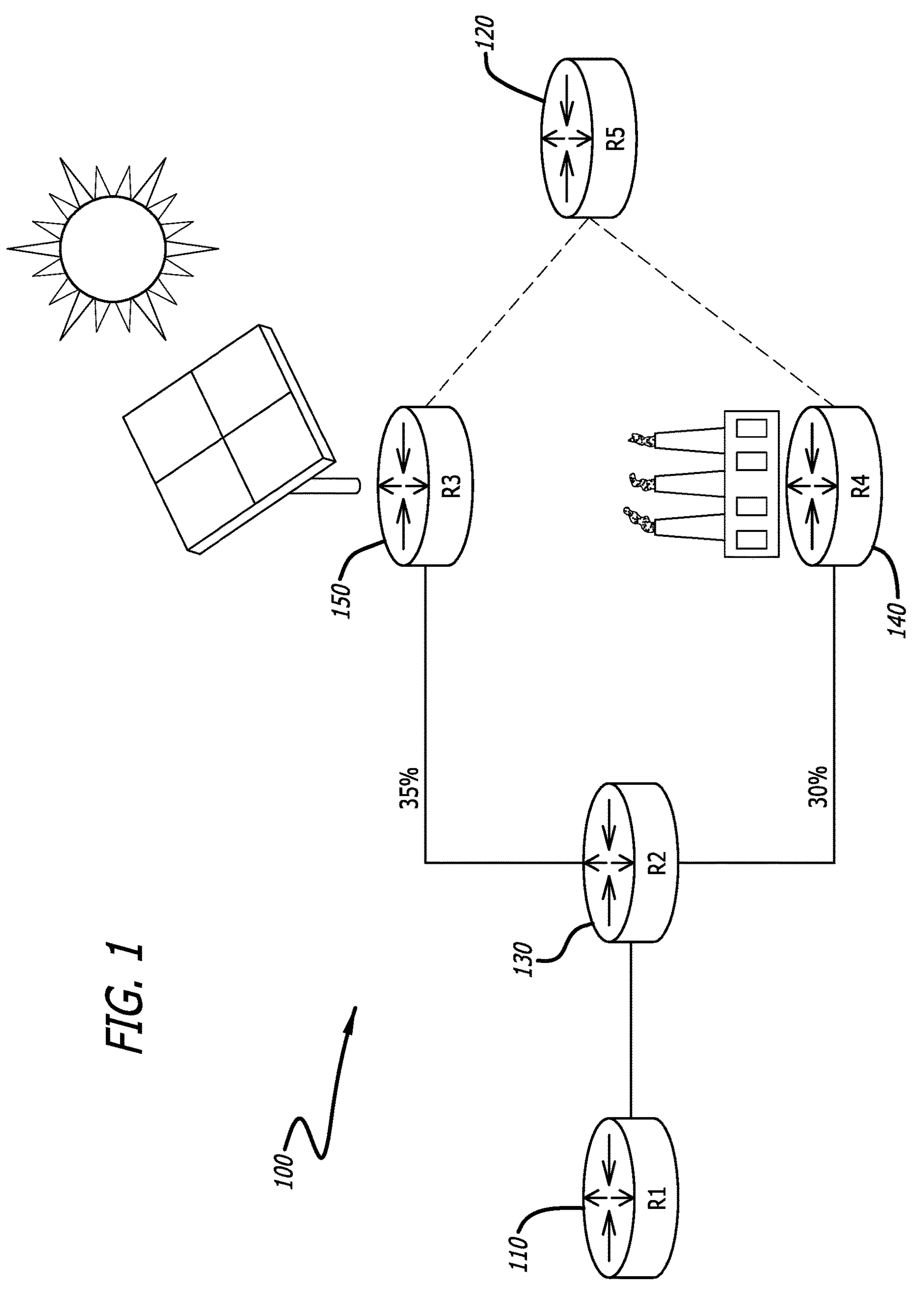
FIG. 1 a schematic diagram of a network with network devices powered by various power source types in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that manage power consumption in network devices by evaluating power consumption at the feature level and dynamically enabling and disabling features based on their predicted power consumption relative to a defined power budget. As those skilled in the art will recognize, the term "feature" can be broad and include both items that can be operated within or by software, or also include hardware configurations and adjustments. By way of example, a network device may comprise a feature of a high-speed port. However, this feature may be turned down or off via either via a software process or by a hardware-based disconnection or other change. In many embodiments, an index of "power consumption per feature" may be created based on the historical configuration of a device and the values of various in-device electrical sensors (e.g., power consumption, temperature, etc.). Sensor data may be collected at regular intervals from groups of network devices, forming historical time series data.

In a number of embodiments, to train a feature-to-power model, features and capabilities of a network device may be extracted based on the operating state and configuration of the network device. A snapshot of the features in use, referred to as the feature list, can be captured either from the options selected by a network operator to determine the functionality of the device or directly accessed from a feature application programming interface (API) or a data model. In a variety of embodiments, a logistic regression model may be utilized to predict the values of individual sensor readings (e.g., power consumption, temperature, etc.) based on the presence or absence of features over time. In some embodiments, after the logistic regression model has been trained, the feature contribution to the power consumption can be determined by evaluating the positive and negative impact that each available feature has on each particular sensor.

In more embodiments, a power budget may be determined based on the expected operating threshold of a device serving a particular function. This power budget may be utilized as a software-based limitation of power utilization so that an organization may comply with sustainability specifications or adopt more sustainable practices. In additional embodiments, features can be labeled with a priority metric based on one or more of trends of energy consumption, overall importance (e.g., the impact on the business), and/or quality of service (QoS) specifications. The feature-to-power mapping model can indicate normal operating ranges for sensor values for an individual feature.

In further embodiments, a power budget may be specified by the network operator. At (regular) time intervals, sensor readings can be compared against the priority of a feature. If there is an increase in the power consumption specified for a mission-critical feature to continue functioning, the feature-to-power model can be consulted to identify features that can be temporarily disabled to balance the power budget below the defined threshold. In still more embodiments, a power budget may relate to different scopes. By way of non-limiting examples, power budgets may be established at the adapter, at the router, and/or at the network level. In still further embodiments, to remain within a global power budget, a power budget may be established for each flow based on criticality of the flow (e.g., based on QoS specifications associated with the flow). In still additional embodiments, the flow may be throttled at the network ingress at one or more points. By way of a non-limiting example, an access control list (ACL) policy that activates a traffic shaping mechanism may be utilized. In some more embodiments, the flow may be sampled. In other words, the features may be applied just to the samples instead of all packets of the flow.

In certain embodiments, an energy budget (e.g., in j(t) (Joule at time t)) may be allocated to a flow. The sum of the energy consumed by all flows may be dynamically managed to remain within the power budget. Some features that are applied to the flow may be turned off based on the criticality of the feature for that flow and the energy that the feature consumes. To achieve this, the features applied to the flows may be profiled, and features that are to be retained and features that are to be disabled may be determined, such that the overall power consumption remains within the confines of the power budget.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-12 as required to realize a particularly desired embodiment. Augmented protocols to carry out these described processes are described below.

Figure 2:
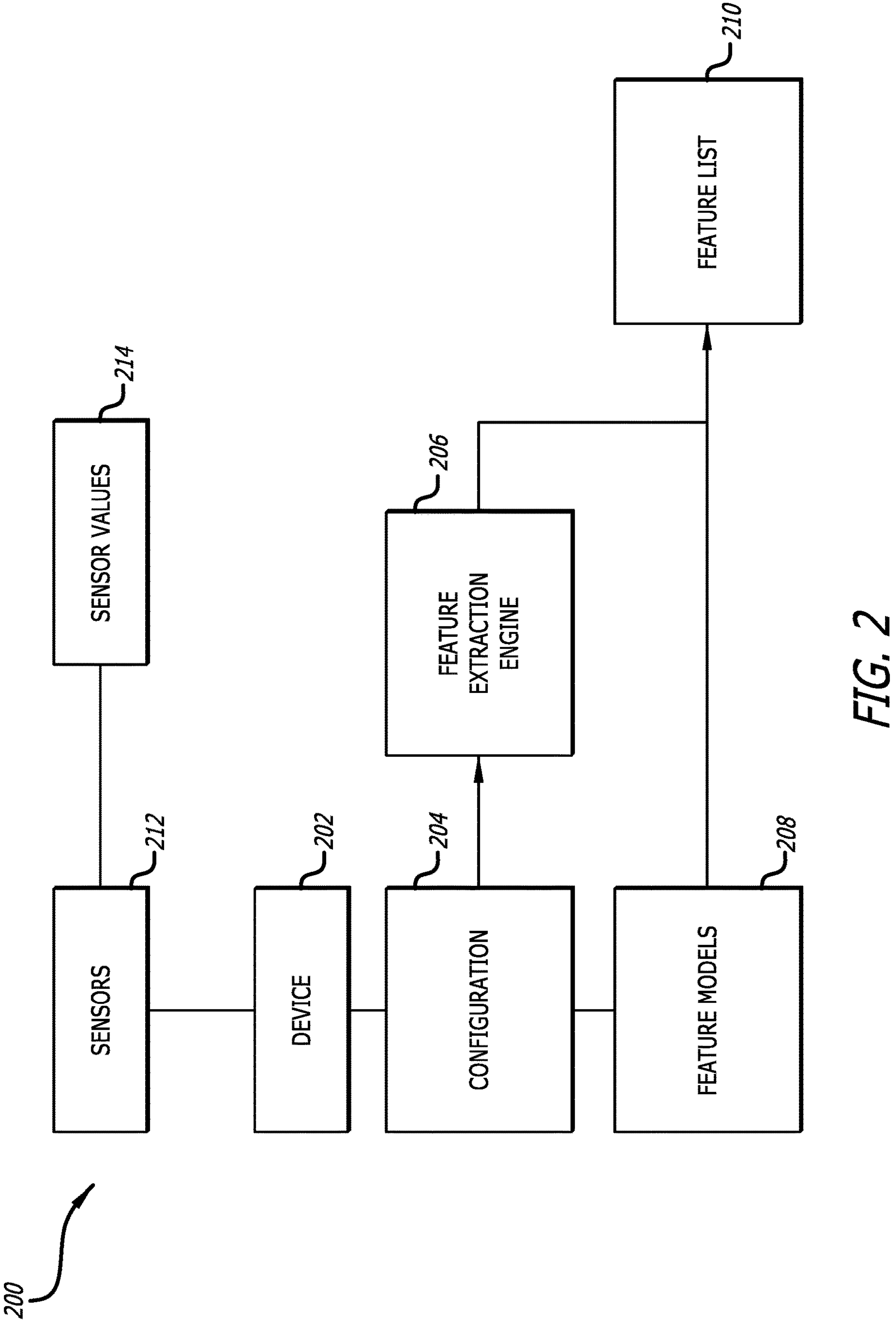
FIG. 2 is a diagram illustrating the components and interactions for collecting historical data in network devices in accordance with various embodiments of the disclosure.

Referring to FIG. 2, a diagram 200 illustrating the components and interactions for collecting historical data in network devices in accordance with various embodiments of the disclosure is shown. In many embodiments, sensors 212 may be incorporated into strategic locations within a network device 202. The sensors 212 can collect various sensor data, such as, but not limited to, power consumption and temperature. The sensor reading data may be represented as sensor values 214. The sensors 212 can continuously monitor the device's performance and provide data for analysis.

In a number of embodiments, the configuration 204 of the network device 202 may include the current operating state and settings of the network device 202, which can be processed by the feature extraction engine 206 to generate the feature list 210. The feature list 210 may be a snapshot of the features in use at a given time. In a variety of embodiments, the feature extraction engine 206 may process the configuration 204 to extract features and capabilities of the network device 202 based on the current operating state of the network device 202.

In some embodiments, the feature list 210 may be generated based on feature data models 208 of the network device 202. In more embodiments, the feature list 210 can be generated utilizing a feature API provided by the network device 202. In additional embodiments, the feature list 210 may be generated based on options selected by a network operator that determine the functionality of the network device 202.

Although a specific embodiment for components and interactions for collecting historical data in network devices suitable for carrying out the various steps, processes, methods, and operations described herein is discussed with respect to FIG. 2, any of a variety of systems and/or processes may be utilized in accordance with embodiments of the disclosure. For example, the system could integrate data from multiple network devices to create a comprehensive power consumption model that accounts for the interactions and dependencies between devices in a network. The elements depicted in FIG. 2 may also be interchangeable with other elements of FIGS. 1 and 3-12 as required to realize a particularly desired embodiment.

Referring to FIG. 3, a diagram 300 illustrating the components and interactions for collecting historical data from multiple devices and generating a feature-to-power model using logistic regression in accordance with various embodiments of the disclosure is shown. In many embodiments, device 1 302 to device n 304 may represent multiple network devices, such as, but not limited to, routers or switches, that can provide historical data for training the feature-to-power model. Each network device may contribute historical sensor values and historical feature lists corresponding to different past times.

In a number of embodiments, sensor values a 306*a* and sensor values b 306*b*, along with feature list a 308*a* and feature list b 308*b*, may be collected from device 1 302. Similarly, sensor values a 310*a* and sensor values b 310*b*, as well as feature list a 312*a* and feature list b 312*b*, can be collected from device n 304. In a variety of embodiments, sensor values and feature list a can correspond to the same past time, while sensor values b and feature list b may correspond to another past time.

In some embodiments, feature lists and sensor values may be input into the logistic regression block 314. The logistic regression block 314 can process the input data and can train a logistic regression model that may predict the values of individual sensor readings based on the presence or non-presence of features over time. In more embodiments, a machine learning model other than a logistic regression model may be utilized.

In additional embodiments, the feature contribution determination block 316 may evaluate the positive and negative impact that each available feature has for each particular sensor after the logistic regression model has been trained. The block 316 may work in conjunction with the combination modeling of feature presence block 318, which can model the iterative enablement and disablement of features to predict the impact of feature usage on sensor values. In further embodiments, the combination modeling of feature presence block may output a predicted range of sensor values per feature, as shown at block 320. In other words, the collected range of sensor reading values based on the presence or non-presence of a feature at a network device may be stored. In still more embodiments, feature-to-power association data 322 (e.g., indexes of power consumption per feature), which may represent the associations between features and their corresponding power consumption, may be derived based on the data at block 320.

Although a specific embodiment for components and interactions for collecting historical data from multiple devices and generating a feature-to-power model using logistic regression suitable for carrying out the various steps, processes, methods, and operations described herein is discussed with respect to FIG. 3, any of a variety of systems and/or processes may be utilized in accordance with embodiments of the disclosure. For example, the system may incorporate advanced machine learning techniques, such as, but not limited to, neural networks or decision trees, to enhance the accuracy and efficiency of the feature-to-power model. The elements depicted in FIG. 3 may also be interchangeable with other elements of FIGS. 1, 2, and 4-12 as required to realize a particularly desired embodiment.

Figure 4:
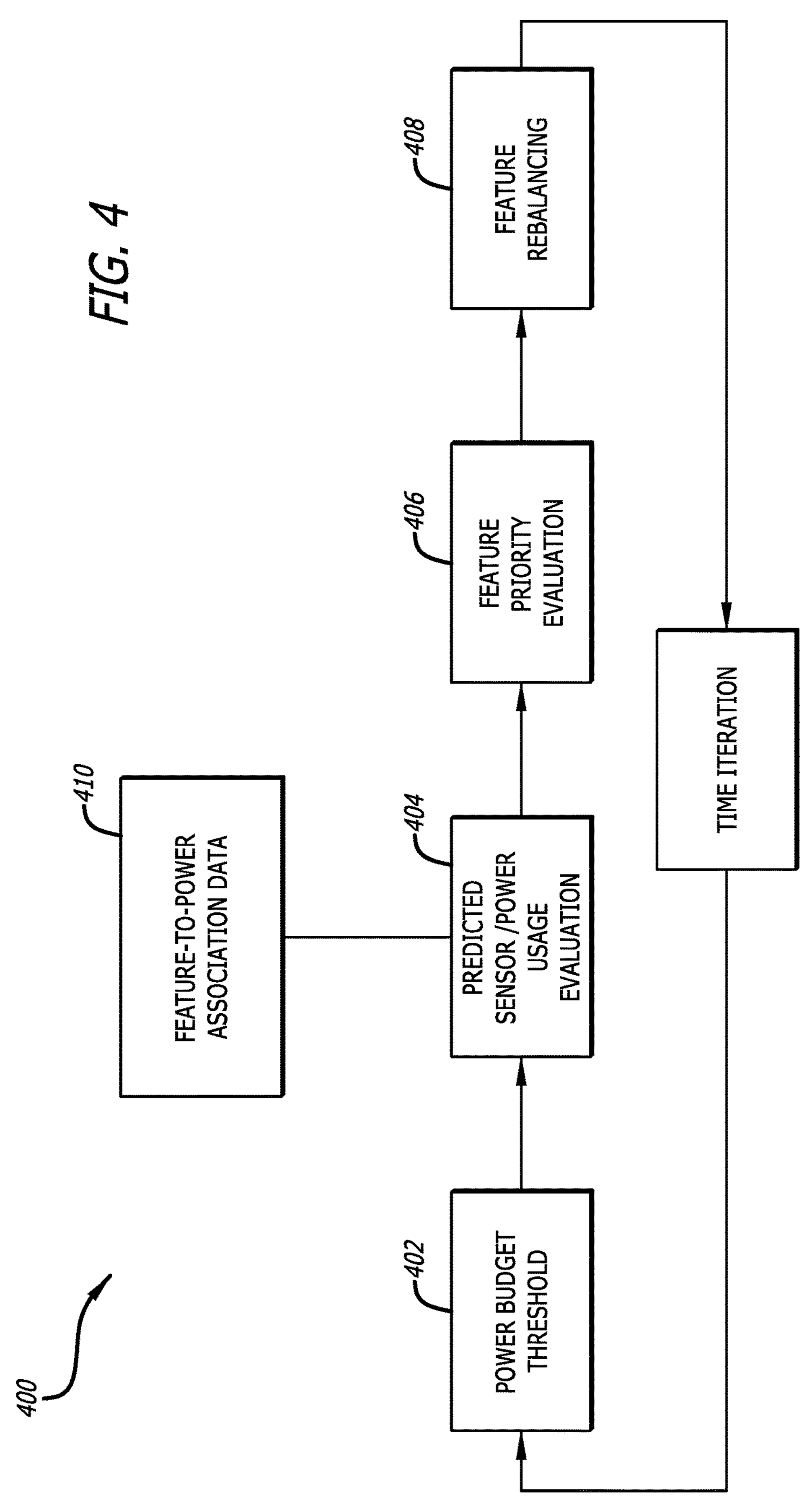
FIG. 4 is a diagram illustrating the components and interactions for managing power consumption through iterative feature rebalancing in accordance with various embodiments of the disclosure.

Referring to FIG. 4, a diagram 400 illustrating the components and interactions for managing power consumption through iterative feature rebalancing in accordance with various embodiments of the disclosure is shown. In many embodiments, the process may begin with a power budget threshold 402, which can represent the maximum allowable power consumption for a network device. This threshold may be set by the user (e.g., a user at a network operator) or determined by the system based on various factors, such as, but not limited to, device specifications or energy efficiency specifications.

In a number of embodiments, a predicted sensor/power usage evaluation 404 may be performed. This evaluation can utilize the feature-to-power association data 410 to estimate the power consumption of the network device based on the current and predicted configurations (i.e., enabled/disabled) of features. The predicted sensor/power usage evaluation 404 can help to determine whether the power budget threshold 402 is being exceeded or if adjustments are needed. In a variety of embodiments, a feature-to-power model, instead of the feature-to-power association data 410, may be consulted to estimate the power consumption of the network device.

In some embodiments, a feature priority evaluation 406 may be conducted to assess the importance of each feature in the network device. This evaluation may consider factors such as, but not limited to, the impact of each feature on the overall performance, user preferences, business operations, QoS specifications, or other criteria. The feature priority evaluation 406 can help to identify which features can be adjusted or disabled to optimize power consumption while maintaining the desired level of performance.

In more embodiments, feature rebalancing 408 may be performed based on the results of the predicted sensor/power usage evaluation 404 and the feature priority evaluation 406. Feature rebalancing 408 can involve adjusting the configuration of features, such as enabling or disabling certain features, to optimize power consumption while staying within the power budget threshold 402. After feature rebalancing 408, the process may return to the power budget threshold 402 for the next iteration, and the cycle continues.

Although a specific embodiment for components and interactions for managing power consumption through iterative feature rebalancing in accordance with various embodiments of the disclosure is discussed with respect to FIG. 4, any of a variety of systems and/or processes may be utilized in accordance with embodiments of the disclosure. For example, the system may incorporate real-time monitoring of power consumption to dynamically adjust the power budget threshold based on changing conditions, such as fluctuations in available power supply or varying performance specifications. The elements depicted in FIG. 4 may also be interchangeable with other elements of FIGS. 1-3 and 5-12 as required to realize a particularly desired embodiment.

Figure 5:
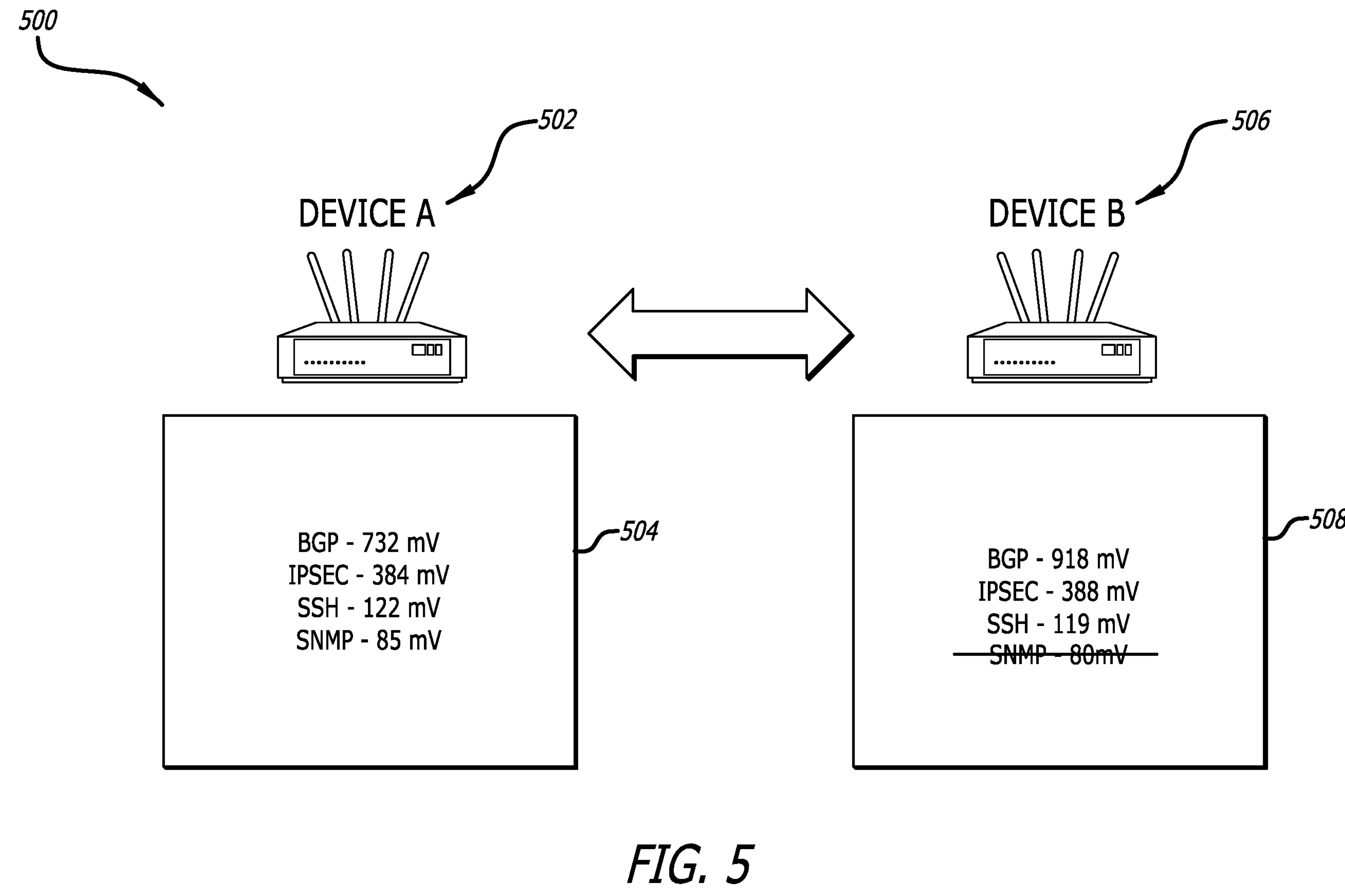
FIG. 5 is a diagram illustrating sensor readings associated with different features in two network devices and their impact on feature shedding in accordance with various embodiments of the disclosure.

Referring to FIG. 5, a diagram 500 illustrating sensor readings associated with different features in two network devices and their impact on feature shedding in accordance with various embodiments of the disclosure is shown. In many embodiments, device A 502 may represent a network device, such as, but not limited to, a router, with a set of features 504. The features 504 can include border gateway protocol (BGP) associated with a sensor reading of 732 mV (e.g., based on consulting the logistic regression model), internet protocol security (IPSEC) associated with a sensor reading of 384 mV, secure shell (SSH) associated with a sensor reading of 122 mV, and simple network management protocol (SNMP) associated with a sensor reading of 85 mV. In a number of embodiments, these values can represent the predicted voltage sensor readings associated with each feature when it is enabled at device A 502.

In a variety of embodiments, device B 506 may represent another network device, such as, but not limited to, a router, with a set of features 508. Similar to features 504, the features 508 can include BGP associated with a sensor reading of 918 mV, IPSEC associated with a sensor reading of 388 mV, SSH associated with a sensor reading of 119 mV, and SNMP associated with a sensor reading of 80 mV. As shown in the embodiment depicted in FIG. 5, the SNMP feature is disabled at device B 506.

In some embodiments, the higher sensor reading for BGP in device B 506 compared to device A 502 may correspond to an increased load on device B. Since BGP (along with IPSEC) may be a high-priority feature that should be maintained for normal network operations, device B 506 can temporarily disable the low-priority SNMP feature to stay within the power budget while allowing the high-priority BGP and IPSEC features to consume more power and serve the increased load.

Although a specific embodiment for sensor readings associated with different features in network devices in accordance with various embodiments of the disclosure is discussed with respect to FIG. 5, any of a variety of systems and/or processes may be utilized in accordance with embodiments of the disclosure. For example, the system may incorporate adaptive processes that dynamically adjust the priority of features based on changing network conditions or user preferences. The elements depicted in FIG. 5 may also be interchangeable with other elements of FIGS. 1-4 and 6-12 as required to realize a particularly desired embodiment.

Figure 6:
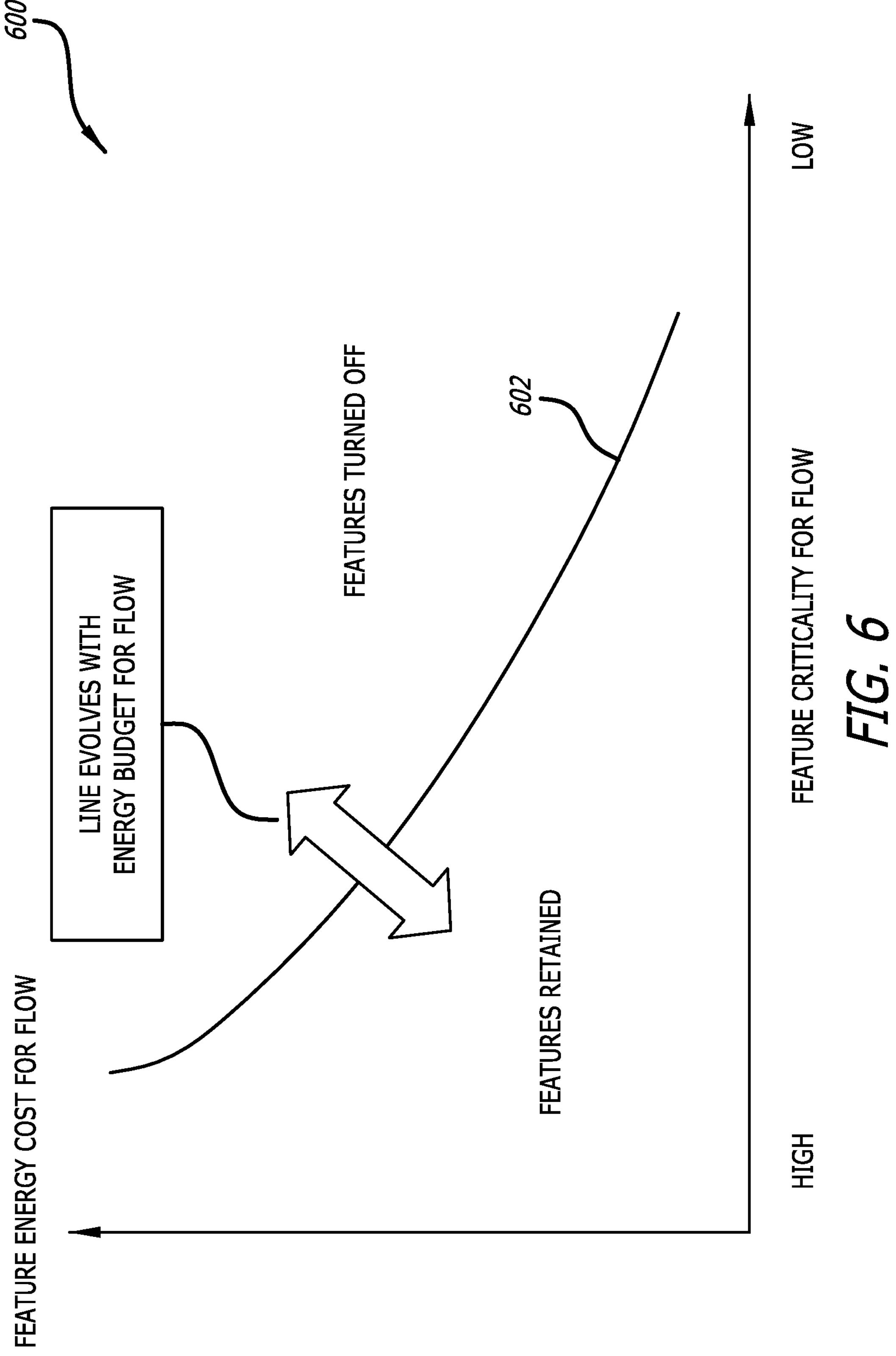
FIG. 6 is a graphical representation demonstrating the switching off of some features that are applied to a network flow based on their criticality and energy consumption in accordance with various embodiments of the disclosure.

Referring to FIG. 6, a graphical representation 600 demonstrating the switching off of some features that are applied to a network flow based on their criticality and energy consumption in accordance with various embodiments of the disclosure is shown. In many embodiments, some features can be switched off for a flow to comply with the power budget, enabling the optimization of power usage while maintaining the more critical features. In particular, some features (e.g., ternary content-addressable memory (TCAM) lookup) that are applied to the flow may be turned off based on the criticality of the feature for that flow and the energy that the feature consumes. To achieve this, the features applied to the flows may be profiled, and features that are to be retained and features that are to be disabled may be determined, such that the overall power consumption remains within the confines of the power budget.

As shown in the embodiment depicted in FIG. 6, a curve 602, starting from the upper-left section and moving diagonally towards the lower-right section, may signify the balance between the significance (criticality) of a feature and its energy usage in a network flow. In particular, as shown, the horizontal axis may represent the criticality of a feature for the flow, with high importance on the left side and low importance on the right side. Further, vertical axis can denote the energy consumption related to a specific feature in the flow.

In a number of embodiments, the curve 602 may represent the boundary that separates the features that are retained (maintained on) from those that are disabled so that the energy consumption may remain within the energy budget. The area beneath the curve 602 can signify that features with a higher level of importance (criticality) and a lower energy consumption are more likely to be kept active for the network flow. In contrast, the area above the curve 602 may indicate that features with a lower level of importance (criticality) and a higher energy consumption are more likely to be switched off to optimize power usage.

In a variety of embodiments, the curve 602 can adapt based on the energy budget allocated for the flow. By way of a non-limiting example, as the energy budget for the flow increases, the curve 602 may shift toward the lower-left section, signifying that more features may be kept active for the flow. Conversely, as the energy budget for the flow increases, the curve 602 may shift toward the upper right section, signifying that more features may be switched off for the flow, so that the energy budget is not exceeded.

While a specific embodiment for a process of switching off some features for a network flow based on their criticality and energy consumption has been discussed with respect to FIG. 6, various systems and processes may be utilized in accordance with embodiments of the disclosure. For instance, the system may incorporate machine learning processes to dynamically adjust the curve 602 based on historical data and real-time network conditions. The elements depicted in FIG. 6 may also be interchangeable with other elements of FIGS. 1-5 and 7-12 as required to realize a particularly desired embodiment.

Figure 7:
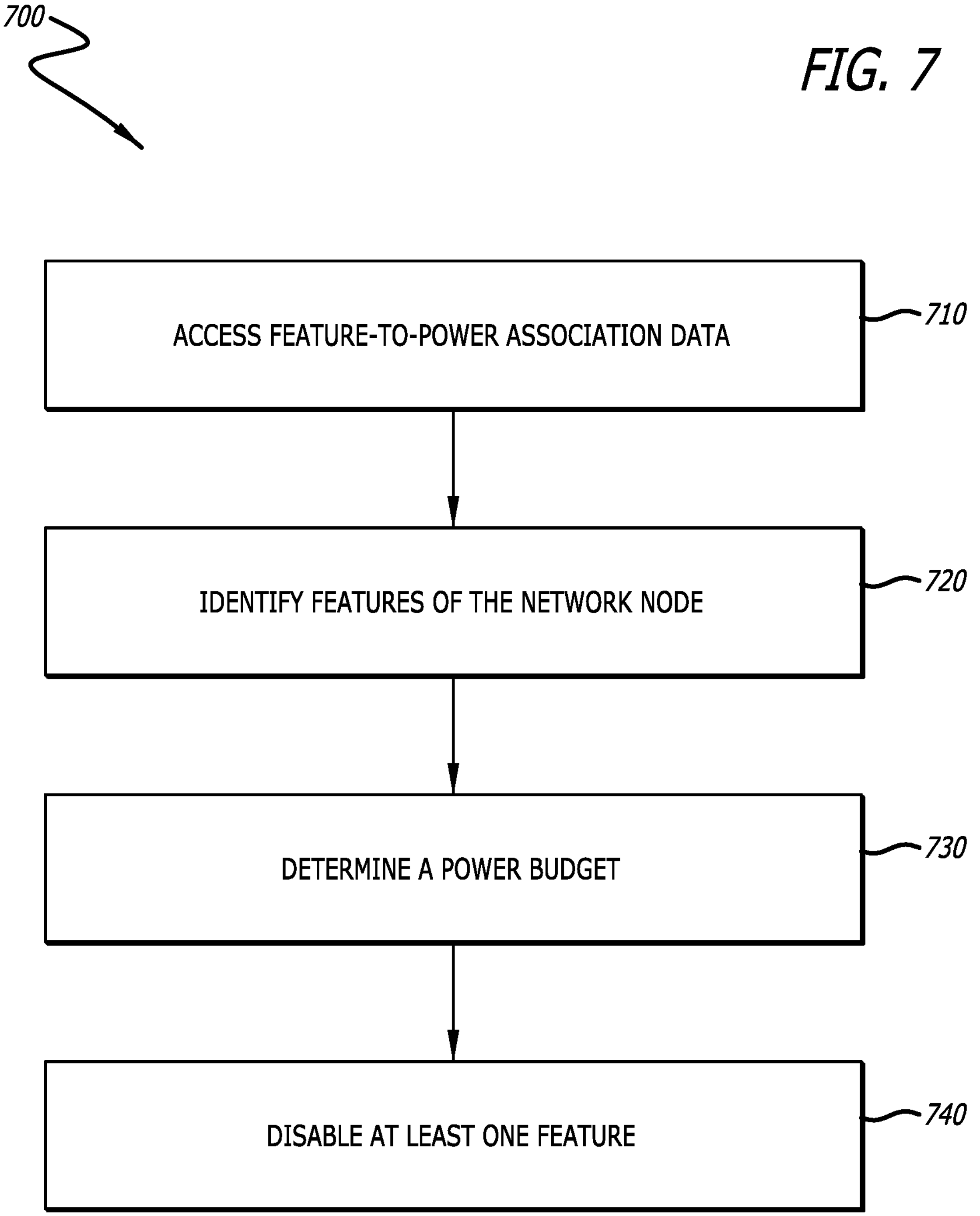
FIG. 7 is a flowchart depicting a process for managing power consumption by disabling features of a network node in accordance with various embodiments of the disclosure.

Referring to FIG. 7, a flowchart depicting a process 700 for managing power consumption by disabling features of a network node in accordance with various embodiments of the disclosure is shown. In many embodiments, the process 700 can access feature-to-power association data (block 710). The feature-to-power association data may be indicative of an index of an impact that each of a plurality of features has on power consumption at the network node. In a number of embodiments, the feature-to-power association data may be derived from a trained machine learning model. The feature-to-power association data may be pre-stored at the network node or may be stored in a database or at another network node.

In a variety of embodiments, the process 700 can identify features of the network node (block 720). In some embodiments, identifying features of the network node may involve analyzing the network node's configuration and examining the enabled features. In more embodiments, the identification of features can be performed through network management protocols or by accessing the network node's internal data structures.

In additional embodiments, the process 700 can determine a power budget (block 730). In further embodiments, the power budget may represent the maximum allowable power consumption for the network node. This budget may be set by the network administrator, calculated based on available power resources, or dynamically adjusted according to the network node's current operating conditions.

In still more embodiments, the process 700 can disable at least one feature (block 740). In still further embodiments, based on the feature-to-power association data, the identified features of the network node, and the determined power budget, the process can decide which features to disable in order to stay within the power budget. In still additional embodiments, the decision to disable a feature may be based on its criticality and/or energy consumption. The disabling of features can be performed through network management protocols or by modifying the network node's internal configuration settings.

Although a specific embodiment for a process for managing power consumption by disabling features of a network node is discussed with respect to FIG. 7, any of a variety of systems and/or processes may be utilized in accordance with embodiments of the disclosure. For example, the process may incorporate real-time monitoring of network conditions to dynamically adjust the power budget and feature disabling decisions. The elements depicted in FIG. 7 may also be interchangeable with other elements of FIGS. 1-6 and 8-12 as required to realize a particularly desired embodiment.

Referring to FIG. 8, a flowchart depicting a process 800 for managing power consumption by dynamically disabling and reenabling features of a network node based on real-time power consumption monitoring in accordance with various embodiments of the disclosure is shown. In many embodiments, the process 800 can access feature-to-power association data (block 810). The feature-to-power association data may be indicative of an index of an impact that each of a plurality of features has on power consumption at the network node. In a number of embodiments, the feature-to-power association data may be derived from a trained machine learning model. The feature-to-power association data may be pre-stored at the network node or may be stored in a database or at another network node.

In a variety of embodiments, the process 800 can identify features of the network node (block 820). In some embodiments, identifying features of the network node may involve analyzing the network node's configuration and examining the enabled features. The process may also consider the network node's hardware and software components, as well as any additional modules or extensions that contribute to power consumption.

In more embodiments, the process 800 can determine a power budget (block 830). In additional embodiments, the power budget may represent the maximum allowable power consumption for the network node, which may be set by the network administrator or calculated based on network conditions. The power budget may also be adjusted dynamically in response to changes in network conditions or sustainability metrics.

In further embodiments, the process 800 can monitor real-time power consumption (block 840). In still more embodiments, monitoring real-time power consumption may involve continuously measuring the power consumption of the network node and its features using sensors or other monitoring devices. The collected data can be analyzed to identify trends and patterns in power usage, which can inform the decision-making process for disabling and reenabling features.

In still further embodiments, the process 800 can determine if the power consumption is going to exceed the power budget (block 845). In some embodiments, when the power consumption does not exceed the power budget, the process 800 can continue monitoring real-time power consumption at block 840. However, in certain embodiments, in response to the power consumption going to exceed the power budget, the process 800 can identify priorities associated with the features.

In still additional embodiments, the process 800 can identify priorities associated with the features (block 850). In some more embodiments, identifying priorities associated with the features may involve determining the importance of each feature based on factors such as network performance, reliability, and security. The process may also take into account any user-defined priorities or preferences for specific features.

In certain embodiments, the process 800 can disable at least one feature (block 860). In yet more embodiments, disabling the at least one feature may involve selecting one or more features to disable based on their priorities and power consumption. The feature disabling process can be performed through network management protocols or by modifying the network node's internal configuration settings.

In yet more embodiments, the process 800 can continue monitoring real-time power consumption (block 870). In still yet more embodiments, continuing monitoring the real-time power consumption may involve measuring the power consumption after disabling the features to ensure that the power budget is maintained. The process may also detect any fluctuations in power usage that could indicate the need for further adjustments to the enabled features.

In many further embodiments, the process 800 can determine if the power consumption is below the power budget, allowing for reenabling the feature (block 875). In some embodiments, when the power consumption remains above the power budget, the process 800 can continue monitoring real-time power consumption at block 870. However, in certain embodiments, in response to the power consumption being below the power budget, the process 800 can reenable the at least one feature.

In many additional embodiments, the process 800 can reenable the at least one feature (block 880). In still yet further embodiments, reenabling the at least one feature may involve activating the previously disabled features when the power consumption is below the power budget. The reenabling process can be performed through network management protocols or by modifying the network node's internal configuration settings. In still further embodiments, the process 800 can reenable the at least one feature in response to a real-time power consumption of the network falling below the power budget.

Although a specific embodiment for a process for managing power consumption by dynamically disabling and reenabling features of a network node based on real-time power consumption monitoring is discussed with respect to FIG. 8, any of a variety of systems and/or processes may be utilized in accordance with embodiments of the disclosure. For example, the process may incorporate advanced power monitoring techniques, such as predictive analytics, to improve the accuracy and responsiveness of real-time power consumption monitoring. The elements depicted in FIG. 8 may also be interchangeable with other elements of FIGS. 1-7 and 9-12 as required to realize a particularly desired embodiment.

Figure 9:
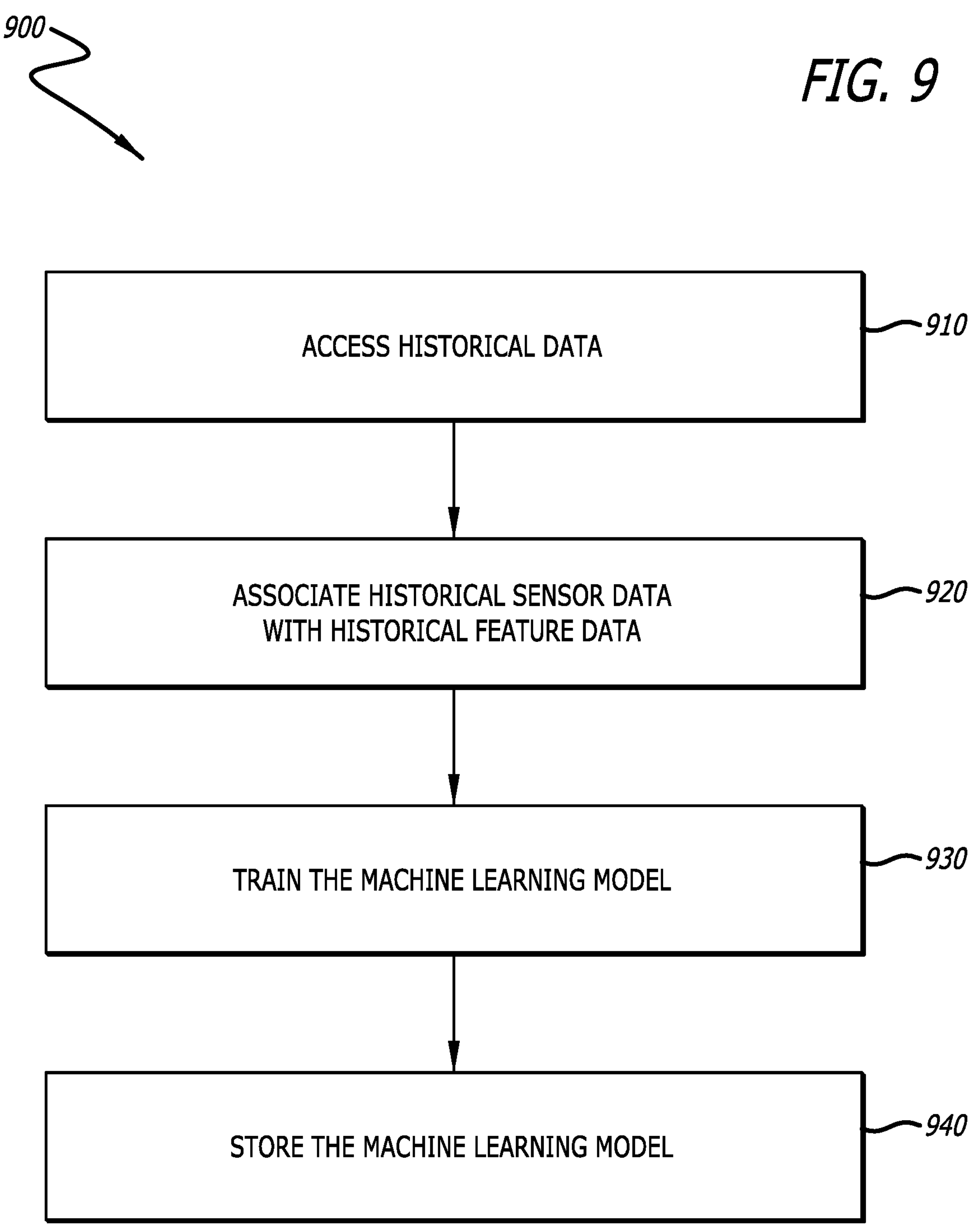
FIG. 9 is a flowchart depicting a process for training a machine learning model to manage power consumption by analyzing historical data in accordance with various embodiments of the disclosure.

Referring to FIG. 9, a flowchart depicting a process 900 for training a machine learning model to manage power consumption by analyzing historical data in accordance with various embodiments of the disclosure is shown. In many embodiments, the process 900 can access historical data (block 910). The historical data may include historical sensor data and historical feature data. In a number of embodiments, accessing the historical data may involve retrieving previously collected data related to the power consumption of the network nodes and features of the network nodes. The historical data may be stored in a centralized database, distributed data storage system, or other data repositories.

In a variety of embodiments, the process 900 can associate historical sensor data with historical feature data (block 920). In some embodiments, associating historical sensor data with historical feature data may involve correlating the power consumption measurements obtained from sensors with the corresponding feature data, such as feature usage patterns, network conditions, and other relevant parameters. This association can enable the creation of a dataset for training the machine learning model.

In more embodiments, the process 900 can train the machine learning model (block 930). The machine learning model may include a logistic regression model. In additional embodiments, training the machine learning model may involve using the dataset to train a machine learning model, such as, but not limited to, a neural network, decision tree, or support vector machine. The training process may involve adjusting the model's parameters to minimize the prediction error and improve the model's ability to predict power consumption based on feature data.

In further embodiments, the process 900 can store the machine learning model (block 940). In still more embodiments, storing the machine learning model may involve saving the trained machine learning model to a storage device, such as a database, file system, or cloud storage service. The stored model can then be utilized by the network nodes or other systems to manage power consumption by predicting the power usage of features and making informed decisions on disabling and reenabling features based on real-time data.

Although a specific embodiment for a process for training a machine learning model to manage power consumption by analyzing historical data is discussed with respect to FIG. 9, any of a variety of systems and/or processes may be utilized in accordance with embodiments of the disclosure. For example, different types of machine learning processes, such as, but not limited to, deep learning or reinforcement learning, may be employed to enhance the prediction accuracy and adaptability of the model. The elements depicted in FIG. 9 may also be interchangeable with other elements of FIGS. 1-8 and 10-12 as required to realize a particularly desired embodiment.

Referring to FIG. 10, a flowchart depicting a process 1000 for training, validating, and updating a machine learning model to manage power consumption by analyzing historical data in accordance with various embodiments of the disclosure is shown. In many embodiments, the process 1000 can access historical data (block 1010). In a number of embodiments, accessing historical data may involve retrieving previously collected data related to the power consumption of the network nodes and features of the network nodes. The historical data may be stored in a centralized database, distributed data storage system, or other data repositories.

In a variety of embodiments, the process 1000 can associate historical sensor data with historical feature data (block 1020). In some embodiments, associating the historical sensor data with the historical feature data may involve correlating the power consumption measurements obtained from sensors with the corresponding feature data, such as feature usage patterns, network conditions, and other relevant parameters. This association can enable the creation of a dataset for training the machine learning model.

In more embodiments, the process 1000 can train the machine learning model (block 1030). The machine learning model may include a logistic regression model. In additional embodiments, training the machine learning model may involve using the dataset to train a machine learning model, such as, but not limited to, a neural network, decision tree, or support vector machine. The training process may involve adjusting the model's parameters to minimize the prediction error and improve the model's ability to predict power consumption based on feature data.

In further embodiments, the process 1000 can determine if the trained machine learning model is validated (block 1035). In some embodiments, when the trained machine learning model is not validated, the process 1000 can continue training the model. However, in certain embodiments, in response to the trained machine learning model being validated, the process 1000 can store the machine learning model. As those skilled in the art will recognize, the machine learning model can be trained either online, offline, or via a combination of both.

In still more embodiments, the process 1000 can store the machine learning model (block 1040). In still further embodiments, storing the machine learning model may involve saving the validated machine learning model to a storage device, such as a database, file system, or cloud storage service. The stored model can then be utilized by the network nodes or other systems to manage power consumption.

In still additional embodiments, the process 1000 can derive feature-to-power association data based on the trained machine learning model (block 1050). In some more embodiments, deriving the feature-to-power association data may involve using the trained model to predict the sensor readings associated with enabling or disabling of various features of the network node. Deriving the feature-to-power association data may create an association between features and their power usage.

In certain embodiments, the process 1000 can distribute the feature-to-power association data (block 1060). In yet more embodiments, distributing the feature-to-power association data may involve sending the derived feature-to-power association data to network nodes, network management systems, or other relevant entities that can utilize the data for power management purposes. The distribution of feature-to-power association data may be performed through various communication protocols, such as, but not limited to, wired or wireless connections.

In still yet more embodiments, the process 1000 can access new historical data for updating the trained machine learning model (block 1070). In still further embodiments, accessing new historical data may involve retrieving additional historical data related to the power consumption of the network nodes and features of the network node. The new historical data can be utilized to further refine the machine learning model.

In still additional embodiments, the process 1000 can update the trained machine learning model based on the new historical data (block 1080). In some more embodiments, updating the trained machine learning model may involve incorporating the new historical data into the existing dataset and retraining the machine learning model to improve its prediction accuracy and adaptability to changing network conditions and power consumption patterns. Updating the trained machine learning model based on the new historical data may also involve fine-tuning the model's hyperparameters or adjusting its architecture to enhance its performance and generalization capabilities.

Figure 11:
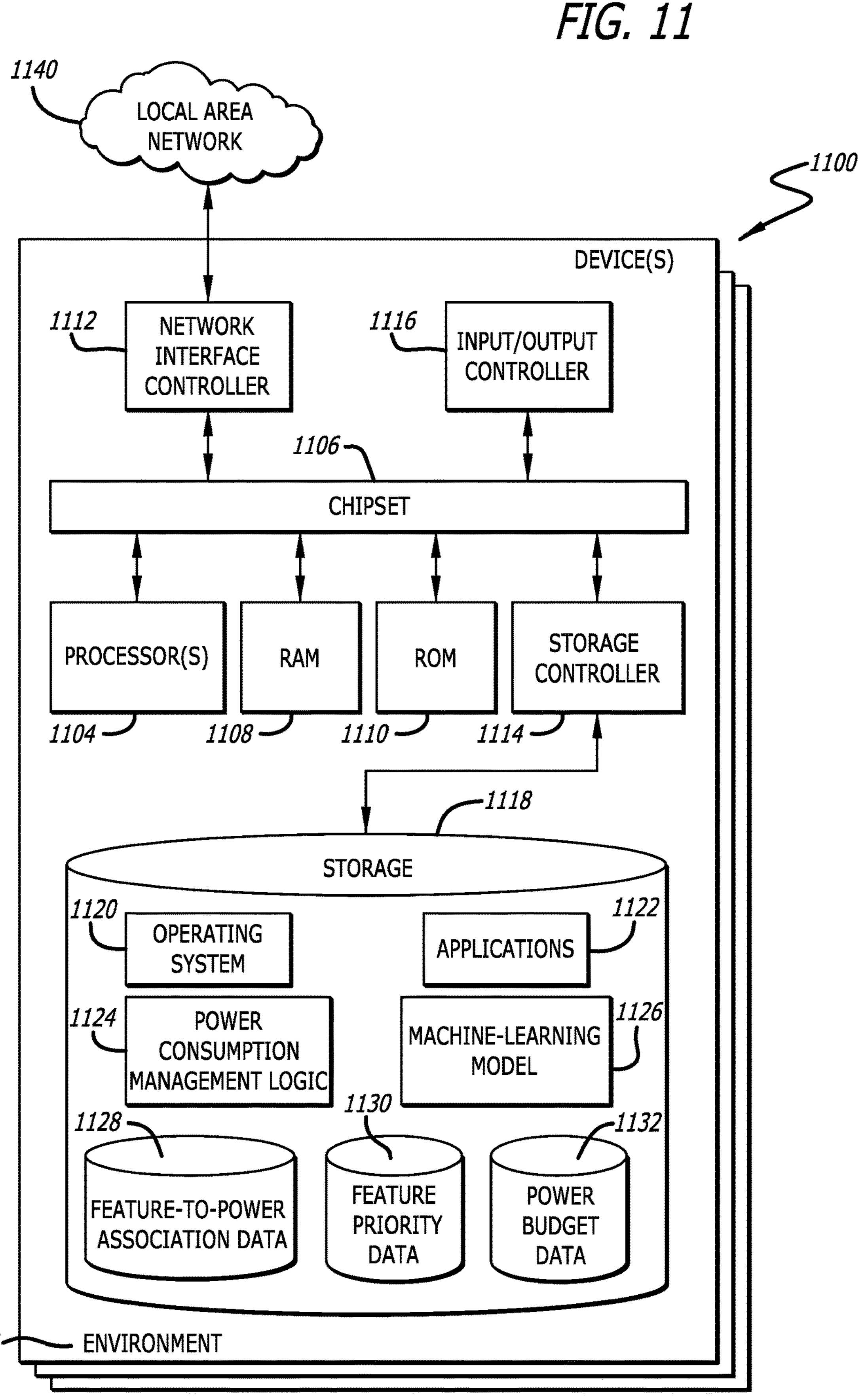
FIG. 11 is a conceptual block diagram for one or more devices capable of executing components and logic in accordance with various embodiments of the disclosure.

Referring to FIG. 11, a conceptual block diagram for one or more devices 1100 capable of executing components and logic for implementing the functionality and embodiments described above is shown. The embodiment of the conceptual block diagram depicted in FIG. 11 can illustrate a conventional server computer, workstation, desktop computer, laptop, tablet, network appliance, e-reader, smartphone, or other computing device, and can be utilized to execute any of the application and/or logic components presented herein. The device 1100 may, in some examples, correspond to physical devices or to virtual resources described herein.

In many embodiments, the device 1100 may include an environment 1102 such as a baseboard or "motherboard," in physical embodiments that can be configured as a printed circuit board with a multitude of components or devices connected by way of a system bus or other electrical communication paths. Conceptually, in virtualized embodiments, the environment 1102 may be a virtual environment that encompasses and executes the remaining components and resources of the device 1100. In more embodiments, one or more processors 1104, such as, but not limited to, central processing units ("CPUs") can be configured to operate in conjunction with a chipset 1106. The processor(s) 1104 can be standard programmable CPUs that perform arithmetic and logical operations necessary for the operation of the computer 1100.

In additional embodiments, the processor(s) 1104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1106 may provide an interface between the processor(s) 1104 and the remainder of the components and devices within the environment 1102. The chipset 1106 can provide an interface to a random-access memory ("RAM") 1108, which can be used as the main memory in the device 1100 in some embodiments. The chipset 1106 can further be configured to provide an interface to a computer-readable storage medium such as a read-only memory ("ROM") 1110 or non-volatile RAM ("NVRAM") for storing basic routines that can help with various tasks such as, but not limited to, starting up the device 1100 and/or transferring information between the various components and devices. The ROM 1110 or NVRAM can also store other application components necessary for the operation of the device 1100 in accordance with various embodiments described herein.

Different embodiments of the device 1100 can be configured to operate in a networked environment using logical connections to remote computing devices and computer systems through a network, such as the network 1140. The chipset 1106 can include functionality for providing network connectivity through a network interface card ("NIC") 1112, which may comprise a gigabit Ethernet adapter or similar component. The NIC 1112 can be capable of connecting the device 1100 to other devices over the network 1140. It is contemplated that multiple NICs 1112 may be present in the device 1100, connecting the device to other types of networks and remote systems.

In further embodiments, the device 1100 can be connected to a storage 1118 that provides non-volatile storage for data accessible by the device 1100. The storage 1118 can, for example, store an operating system 1120, applications 1122, and feature-to-power association data 1128, feature priority data 1130, power budget data 1132, which are described in greater detail below. The storage 1118 can be connected to the environment 1102 through a storage controller 1114 connected to the chipset 1106. In certain embodiments, the storage 1118 can consist of one or more physical storage units. The storage controller 1114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1100 can store data within the storage 1118 by transforming the physical state of the physical storage units to reflect the information being stored. The specific transformation of physical state can depend on various factors. Examples of such factors can include, but are not limited to, the technology used to implement the physical storage units, whether the storage 1118 is characterized as primary or secondary storage, and the like.

For example, the device 1100 can store information within the storage 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1100 can further read or access information from the storage 1118 by detecting the physical states or characteristics of one or more particular locations within the physical storage units.

In addition to the storage 1118 described above, the device 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1100. In some examples, the operations performed by a cloud computing network, and or any components included therein, may be supported by one or more devices similar to device 1100. Stated otherwise, some or all of the operations performed by the cloud computing network, and or any components included therein, may be performed by one or more computer devices 1100 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1118 can store an operating system 1120 utilized to control the operation of the device 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1118 can store other system or application programs and data utilized by the device 1100.

In various embodiment, the storage 1118 or other computer-readable storage media is encoded with computer-executable instructions which, when loaded into the device 1100, may transform it from a general-purpose computing system into a special-purpose computer capable of implementing the embodiments described herein. These computer-executable instructions may be stored as application 1122 and transform the device 1100 by specifying how the processor(s) 1104 can transition between states, as described above. In some embodiments, the device 1100 has access to computer-readable storage media storing computer-executable instructions which, when executed by the device 1100, perform the various processes described above with regard to FIGS. 1-10 and 12. In more embodiments, the device 1100 can also include computer-readable storage media having instructions stored thereupon for performing any of the other computer-implemented operations described herein.

In still further embodiments, the device 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can be configured to provide output to a display, such as a computer monitor, a flat panel display, a digital projector, a printer, or other type of output device. Those skilled in the art will recognize that the device 1100 might not include all of the components shown in FIG. 11 and can include other components that are not explicitly shown in FIG. 11 or might utilize an architecture completely different than that shown in FIG. 11.

As described above, the device 1100 may support a virtualization layer, such as one or more virtual resources executing on the computer 1100. In some examples, the virtualization layer may be supported by a hypervisor that provides one or more virtual machines running on the computer 1100 to perform functions described herein. The virtualization layer may generally support a virtual resource that performs at least a portion of the techniques described herein.

In many embodiments, the device 1100 can include a power consumption management logic 1124. The power consumption management logic 1124 may control the power consumption of various features by utilizing real-time monitoring and feature-to-power association. The power consumption management logic 1124 can operate by dynamically disabling and reenabling features based on their priorities and power consumption levels in response to the current power budget and network conditions.

In a number of embodiments, the storage 1118 can include feature-to-power association data 1128. Feature-to-power association data 1128 may be a dataset that indicates the power consumption of various individual features within a network node. The feature-to-power association data 1128 can be derived from a machine learning model trained on historical sensor data and historical feature data and can be utilized by the power consumption management logic 1124 to make informed decisions on disabling and reenabling features.

In various embodiments, the storage 1118 can include feature priority data 1130. Feature priority data 1130 may be a dataset that assigns priority levels to different features within a network node based on factors such as network performance, reliability, and security. The feature priority data 1130 can be utilized by the power consumption management logic 1124 to determine which features to disable or reenable in order to maintain the power budget while considering the importance of each feature.

In still more embodiments, the storage 1118 can include power budget data 1132. Power budget data 1132 can represent the maximum allowable power consumption for a network node, taking into account network conditions and sustainability goals. The power consumption management logic 1124 can use the power budget data 1132 to make decisions on disabling and reenabling features, ensuring that the overall power usage of the network node remains within the defined power budget.

Finally, in many embodiments, data may be processed into a format usable by a machine-learning model 1126 (e.g., feature vectors), and or other pre-processing techniques. The machine-learning ("ML") model 1126 may be any type of ML model, such as supervised models, reinforcement models, and/or unsupervised models. The ML model 1126 may include one or more of linear regression models, logistic regression models, decision trees, Naïve Bayes models, neural networks, k-means cluster models, random forest models, and/or other types of ML models 1126. The ML model 1126 may be configured to learn the relationship between feature usage patterns, network conditions, and power consumption, enabling the ML model 1126 to predict power usage and inform the power consumption management logic 1124's decisions on disabling and reenabling features.

Figure 12:
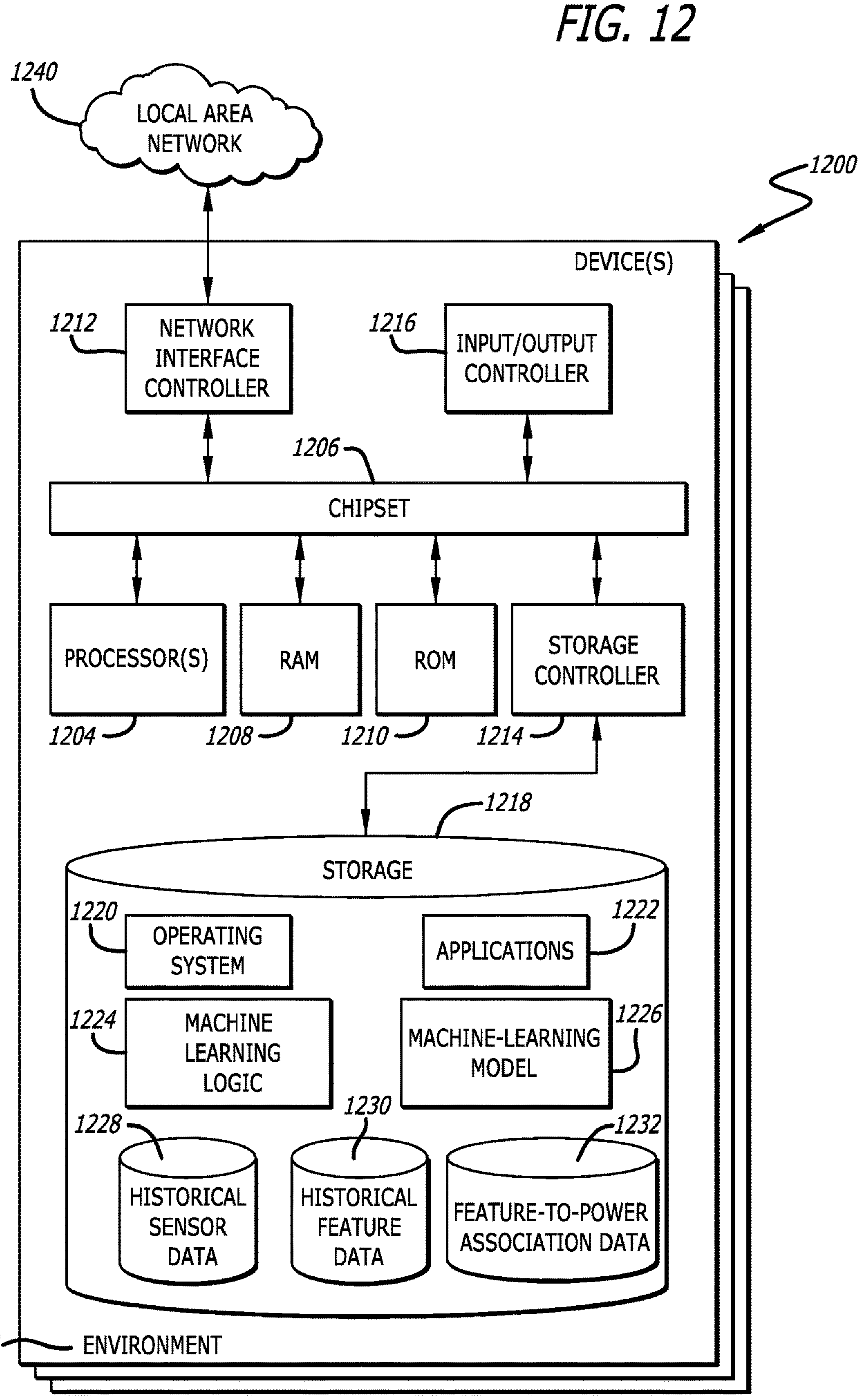
FIG. 12 is a conceptual block diagram for one or more devices capable of executing components and logic in accordance with various embodiments of the disclosure.

Referring to FIG. 12, a conceptual block diagram for one or more devices 1200 capable of executing components and logic for implementing the functionality and embodiments described above is shown. The embodiment of the conceptual block diagram depicted in FIG. 12 can illustrate a conventional server computer, workstation, desktop computer, laptop, tablet, network appliance, e-reader, smartphone, or other computing device, and can be utilized to execute any of the application and/or logic components presented herein. The device 1200 may, in some examples, correspond to physical devices or to virtual resources described herein.

In many embodiments, the device 1200 may include an environment 1202 such as a baseboard or "motherboard," in physical embodiments that can be configured as a printed circuit board with a multitude of components or devices connected by way of a system bus or other electrical communication paths. Conceptually, in virtualized embodiments, the environment 1202 may be a virtual environment that encompasses and executes the remaining components and resources of the device 1200. In more embodiments, one or more processors 1204, such as, but not limited to, central processing units ("CPUs") can be configured to operate in conjunction with a chipset 1206. The processor(s) 1204 can be standard programmable CPUs that perform arithmetic and logical operations necessary for the operation of the computer 1200.

In additional embodiments, the processor(s) 1204 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1206 may provide an interface between the processor(s) 1204 and the remainder of the components and devices within the environment 1202. The chipset 1206 can provide an interface to a random-access memory ("RAM") 1208, which can be used as the main memory in the device 1200 in some embodiments. The chipset 1206 can further be configured to provide an interface to a computer-readable storage medium such as a read-only memory ("ROM") 1210 or non-volatile RAM ("NVRAM") for storing basic routines that can help with various tasks such as, but not limited to, starting up the device 1200 and/or transferring information between the various components and devices. The ROM 1210 or NVRAM can also store other application components necessary for the operation of the device 1200 in accordance with various embodiments described herein.

Different embodiments of the device 1200 can be configured to operate in a networked environment using logical connections to remote computing devices and computer systems through a network, such as the network 1240. The chipset 1206 can include functionality for providing network connectivity through a network interface card ("NIC") 1212, which may comprise a gigabit Ethernet adapter or similar component. The NIC 1212 can be capable of connecting the device 1200 to other devices over the network 1240. It is contemplated that multiple NICs 1212 may be present in the device 1200, connecting the device to other types of networks and remote systems.

In further embodiments, the device 1200 can be connected to a storage 1218 that provides non-volatile storage for data accessible by the device 1200. The storage 1218 can, for example, store an operating system 1220, applications 1222, and historical sensor data 1228, historical feature data 1230, feature-to-power association data 1232, which are described in greater detail below. The storage 1218 can be connected to the environment 1202 through a storage controller 1214 connected to the chipset 1206. In certain embodiments, the storage 1218 can consist of one or more physical storage units. The storage controller 1214 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1200 can store data within the storage 1218 by transforming the physical state of the physical storage units to reflect the information being stored. The specific transformation of physical state can depend on various factors. Examples of such factors can include, but are not limited to, the technology used to implement the physical storage units, whether the storage 1218 is characterized as primary or secondary storage, and the like.

For example, the device 1200 can store information within the storage 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1200 can further read or access information from the storage 1218 by detecting the physical states or characteristics of one or more particular locations within the physical storage units.

In addition to the storage 1218 described above, the device 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1200. In some examples, the operations performed by a cloud computing network, and or any components included therein, may be supported by one or more devices similar to device 1200. Stated otherwise, some or all of the operations performed by the cloud computing network, and or any components included therein, may be performed by one or more computer devices 1200 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1218 can store an operating system 1220 utilized to control the operation of the device 1200. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1218 can store other system or application programs and data utilized by the device 1200.

In various embodiment, the storage 1218 or other computer-readable storage media is encoded with computer-executable instructions which, when loaded into the device 1200, may transform it from a general-purpose computing system into a special-purpose computer capable of implementing the embodiments described herein. These computer-executable instructions may be stored as application 1222 and transform the device 1200 by specifying how the processor(s) 1204 can transition between states, as described above. In some embodiments, the device 1200 has access to computer-readable storage media storing computer-executable instructions which, when executed by the device 1200, perform the various processes described above with regard to FIGS. 1-11. In more embodiments, the device 1200 can also include computer-readable storage media having instructions stored thereupon for performing any of the other computer-implemented operations described herein.

In still further embodiments, the device 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can be configured to provide output to a display, such as a computer monitor, a flat panel display, a digital projector, a printer, or other type of output device. Those skilled in the art will recognize that the device 1200 might not include all of the components shown in FIG. 12 and can include other components that are not explicitly shown in FIG. 12 or might utilize an architecture completely different than that shown in FIG. 12.

As described above, the device 1200 may support a virtualization layer, such as one or more virtual resources executing on the computer 1200. In some examples, the virtualization layer may be supported by a hypervisor that provides one or more virtual machines running on the computer 1200 to perform functions described herein. The virtualization layer may generally support a virtual resource that performs at least a portion of the techniques described herein.

In many embodiments, the device 1200 can include a machine learning logic 1224. The machine learning logic 1224 may process historical data (including historical sensor data 1228 and historical feature data 1230) and train a machine learning model to predict power consumption based on feature usage patterns and/or network conditions. The machine learning logic 1224 can incorporate various machine learning processes, such as, but not limited to, neural networks, decision trees, or support vector machines, to analyze the data and generate predictions.

In a number of embodiments, the storage 1218 can include historical sensor data 1228. Historical sensor data 1228 may be a collection of previously recorded sensor reading measurements obtained from sensors within a network node. The historical sensor data 1228 may be utilized in conjunction with historical feature data 1230 to create a dataset for training the machine learning model.

In various embodiments, the storage 1218 can include historical feature data 1230. Historical feature data 1230 may be a collection of previously recorded data related to the usage patterns, network conditions, and operational parameters of various features within a network node. The historical feature data 1230 can be combined with the historical sensor data 1228 to create a dataset for training the machine learning model.

In still more embodiments, the storage 1218 can include feature-to-power association data 1232. Feature-to-power association data 1232 may be a dataset derived from the trained machine learning model. The feature-to-power association data 1232 can be generated by applying the machine learning model to historical sensor data and feature data and can indicate the association between features and their power usage. In additional embodiments, the feature-to-power association data 1232 can be transmitted to a network node by the machine learning logic.

Finally, in many embodiments, data may be processed into a format usable by a machine-learning model 1226 (e.g., feature vectors), and or other pre-processing techniques. The machine-learning ("ML") model 1226 may be any type of ML model, such as supervised models, reinforcement models, and/or unsupervised models. The ML model 1226 may include one or more of linear regression models, logistic regression models, decision trees, Naïve Bayes models, neural networks, k-means cluster models, random forest models, and/or other types of ML models 1226. The ML model 1226 may be configured to learn the relationship between feature usage patterns, network conditions, and power consumption, enabling the ML model 1226 to derive feature-to-power association data and inform the power consumption management process.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

What is claimed is:

1. A network node, comprising: a processor; at least one network interface controller configured to provide access to a network; and a memory communicatively coupled to the processor, wherein the memory comprises a power consumption management logic that is configured to: access feature-to-power association data, the feature-to-power association data being derived from a machine learning process; identify a plurality of features of the network node, each of the plurality of features being associated with a priority; determine a power budget; and disable at least one feature of the plurality of features based on the power budget, the priority associated with the at least one feature, and the feature-to-power association data; throttle a flow at a network ingress point based on the power budget and the feature-to-power association data; and sample a subset of packets of the flow based on the power budget and the feature-to-power association data.

2. The network node of claim 1, wherein the power consumption management logic is configured to determine a real-time power consumption level of the network node based on reading at least one sensor of the network node, and wherein the at least one feature is enabled or disabled based further on the determined real-time power consumption level.

3. The network node of claim 1, wherein the feature-to-power association data is indicative of an index of an impact that each of the plurality of features has on power consumption at the network node.

4. The network node of claim 1, wherein the at least one feature is disabled in response to an increased power consumption by a second feature of the plurality of features, the second feature being associated with a greater priority than the at least one feature.

5. The network node of claim 1, wherein the power consumption management logic is further configured to reenable the at least one feature in response to a real-time power consumption level of the network node falling below the power budget.

6. The network node of claim 1, wherein the network node comprises at least one of a router, a switch, or a line card.

7. The network node of claim 1, wherein the machine learning process is associated with a logistic regression model.

8. The network node of claim 7, wherein the logistic regression model is trained online.

9. The network node of claim 7, wherein the logistic regression model is trained offline.

10. A method for network node feature shedding, comprising: accessing feature-to-power association data, the feature-to-power association data being derived from a machine learning process; identifying a plurality of features of a network node, each of the plurality of features being associated with a priority; determining a power budget; and disabling at least one feature of the plurality of features based on the power budget, the priority associated with the at least one feature, and the feature-to-power association data; throttling a flow at a network ingress point based on the power budget and the feature-to-power association data; and sampling a subset of packets of the flow based on the power budget and the feature-to-power association data.

11. The method of claim 10, wherein the feature-to-power association data is indicative of an index of an impact that each of the plurality of features has on power consumption at the network node.

* * * * *